US008901200B2

(12) United States Patent
Kida et al.

(10) Patent No.: US 8,901,200 B2
(45) Date of Patent: Dec. 2, 2014

(54) RADIATION-CURABLE INK COMPOSITION, INK JET RECORDING PROCESS, AND RECORDED MATTER

(75) Inventors: Hiroaki Kida, Matsumoto (JP); Toshiyuki Miyabayashi, Suwa (JP); Satoru Miura, Matsumoto (JP); Toru Saito, Minowa (JP); Hiroki Nakane, Matsumoto (JP); Jun Ito, Shimosuwa (JP); Taketoshi Kagose, Shiojiri (JP); Chigusa Sato, Shiojiri (JP); Hiroyuki Kajimoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 381 days.

(21) Appl. No.: 13/025,663

(22) Filed: Feb. 11, 2011

(65) Prior Publication Data
US 2011/0200794 A1 Aug. 18, 2011

(30) Foreign Application Priority Data
Feb. 12, 2010 (JP) ................................. 2010-028674

(51) Int. Cl.
*C08F 2/46* (2006.01)
*C08F 2/48* (2006.01)
*C08F 2/44* (2006.01)
*C09D 11/30* (2014.01)
*C09D 4/00* (2006.01)
*C09D 11/101* (2014.01)

(52) U.S. Cl.
CPC *C09D 11/30* (2013.01); *C09D 4/00* (2013.01); *C09D 11/101* (2013.01)

USPC ........... 522/184; 523/161; 523/160; 522/186; 427/487; 524/853

(58) Field of Classification Search
USPC .................. 524/548, 853; 522/182, 186, 184; 428/195.5; 427/487; 523/160, 161
See application file for complete search history.

(56) References Cited

U.S. PATENT DOCUMENTS

| 7,753,514 | B2 | 7/2010 | Nakano et al. |
| 8,092,869 | B2* | 1/2012 | Nakamura et al. ............ 427/511 |
| 8,128,843 | B2* | 3/2012 | Umebayashi et al. ........ 252/500 |
| 2009/0041991 | A1* | 2/2009 | Takano et al. .............. 428/195.1 |
| 2009/0124720 | A1* | 5/2009 | Tsuchiya et al. .............. 522/182 |
| 2009/0186163 | A1 | 7/2009 | Umebayashi et al. |
| 2011/0159251 | A1* | 6/2011 | Sato et al. .................. 428/195.1 |

FOREIGN PATENT DOCUMENTS

| JP | 2006199924 A | 8/2006 |
| JP | 2007131754 A | 5/2007 |
| JP | 20087687 A | 7/2008 |
| JP | 2009-035650 A | 2/2009 |
| JP | 2009-197194 A | 9/2009 |
| WO | WO 2008127930 A1 * | 10/2008 |

* cited by examiner

*Primary Examiner* — Satya Sastri
(74) *Attorney, Agent, or Firm* — Nutter McClennen & Fish LLP; John J. Penny, Jr.; Taylor M. Coon

(57) ABSTRACT

A radiation-curable ink composition includes an acrylate monomer of which homopolymer has a glass transition temperature of not higher than 0° C. in an amount of 20% by mass or more and 65% by mass or less based on the total amount of reaction components; a monofunctional acrylate having an alicyclic structure; and a multifunctional acrylate having an alicyclic structure.

12 Claims, 2 Drawing Sheets

RADIATION-CURABLE INK COMPOSITION, INK JET RECORDING PROCESS, AND RECORDED MATTER

BACKGROUND

1. Technical Field

The present invention relates to a radiation-curable ink composition and relates to an ink jet recording process using the same and a recorded matter.

2. Related Art

Recently, radiation-curable inks, which are cured by irradiation with ultraviolet rays, electron beams, or other radiation, have been being developed. Such radiation-curable inks are quick-drying and, therefore, can achieve recording without bleeding on a non-absorbing medium that does not absorb or hardly absorb ink, such as plastics, glass, or coated paper. The radiation-curable inks are constituted of polymerizable monomers, polymerization initiators, pigments, and other additives.

Incidentally, in a case that a recorded matter in which an image is recorded on a recording medium having flexibility, such as a polyethylene terephthalate resin or a vinyl chloride resin, is attached to goods having a curved surface, such as a car body, since the recorded matter is usually used in an elongated state, it is desirable that the image recorded on the recording medium have a degree of elongation of 100% or more not to cause cracking or peeling-off when it is stretched and also have durability that can withstand such as a degree of elongation.

In order to record a flexible image having a degree of elongation of 100% or more, an existing radiation-curable ink contains a polymerizable monomer such as long-chain alkyl acrylate, phenoxyethyl acrylate, or an ethylene oxide adduct of phenoxyethyl acrylate (for example, see JP-A-2006-199924, JP-A-2007-131754, and JP-A-2008-7687).

However, even in an image recorded using a radiation-curable ink containing the above-described specific polymerizable monomer, if the image is held in an elongated state (for example, a degree of elongation of 100%) together with the recording medium, cracking occurs within several hours, and, further, the image peels off from the recording medium. In addition, the toughness of the recorded image is insufficient, and the abrasion resistance is inferior.

Furthermore, in existing radiation-curable ink compositions, ethylene glycol bifunctional monomers or propylene glycol bifunctional monomers are widely used as crosslinking agents. However, some images recorded using radiation-curable inks containing these bifunctional monomers as crosslinking agents are inferior in weather resistance.

SUMMARY

An advantage of some aspects of the invention is to provide a radiation-curable ink composition that can record an image excellent in flexibility, elongation resistance, abrasion resistance, and weather resistance.

An advantage of some aspects of the invention is to solve at least a part of the problems described above, and the invention can be realized as the following aspects or application examples.

Application Example 1

A radiation-curable ink composition according to an aspect of the invention includes:
- an acrylate monomer (A), of which homopolymer has a glass transition temperature of not higher than 0° C., in an amount of 20% by mass or more and 65% by mass or less based on the total amount of reaction components;
- a monofunctional acrylate (B) having an alicyclic structure; and
- a multifunctional acrylate (C) having an alicyclic structure.

According to the radiation-curable ink composition of Application Example 1, an image recorded thereby is excellent in flexibility, elongation resistance, abrasion resistance, and weather resistance.

Application Example 2

In the radiation-curable ink composition according to Application Example 1, the multifunctional acrylate (C) having an alicyclic structure can be contained in an amount of 1% by mass or more and 20% by mass or less based on the total amount of the reaction components.

Application Example 3

In the radiation-curable ink composition according to Application Example 1 or 2, the multifunctional acrylate (C) having an alicyclic structure can be dimethylol tricyclodecane diacrylate.

Application Example 4

In the radiation-curable ink composition according to any one of Application Examples 1 to 3, the monofunctional acrylate (B) having an alicyclic structure can be contained in an amount of 20% by mass or more and 65% by mass or less based on the total amount of the reaction components.

Application Example 5

In the radiation-curable ink composition according to any one of Application Examples 1 to 4, the monofunctional acrylate (B) having an alicyclic structure can be at least one selected from dicyclopentenyl acrylate, dicyclopentanyl acrylate, and dicyclopentenyloxyethyl acrylate.

Application Example 6

The radiation-curable ink composition according to any one of Application Examples 1 or 5 can further include an aminoacrylate (D).

Application Example 7

The radiation-curable ink composition according to any one of Application Examples 1 or 6 can further include a photopolymerization initiator (E).

Application Example 8

The radiation-curable ink composition according to any one of Application Examples 1 or 7 can have a viscosity at 20° C. of 10 mPa·s or more and 40 mPa·s or less and a surface tension at 20° C. of 20 mN/m or more and 30 mN/m or less.

Application Example 9

An ink jet recording process according to an aspect of the invention includes the steps of:
(a) discharging the radiation-curable ink composition according to any one of Application Examples 1 to 8 on a recording medium; and
(b) irradiating the discharged radiation-curable ink composition with active radiation having an emission peak wavelength in a range of 350 to 430 nm emitted by an active radiation light source.

Application Example 10

A recorded matter according to an aspect of the invention is that recorded by the ink jet recording process according to Application Example 9.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
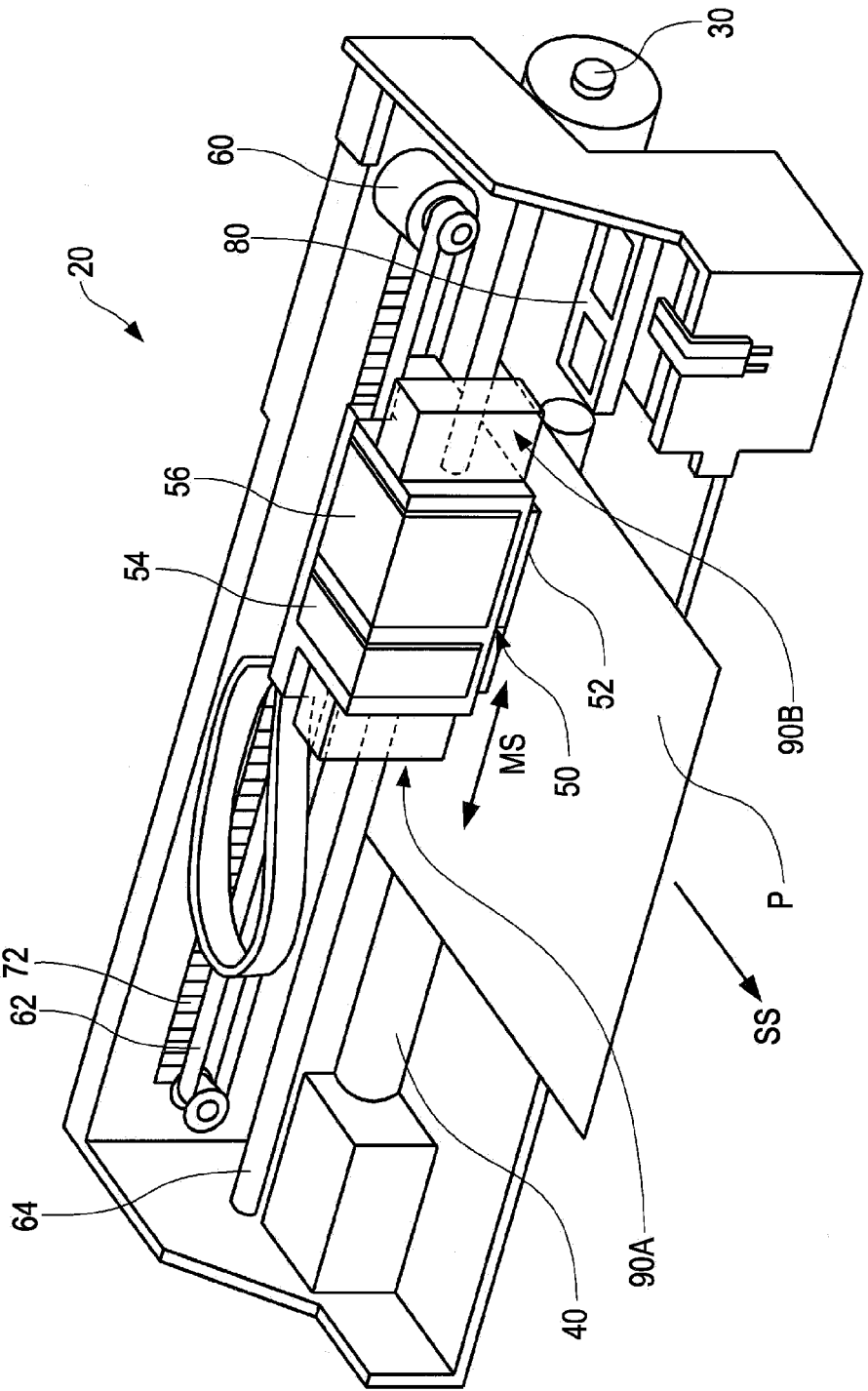
FIG. 1 is a perspective view of an ink jet recording apparatus that can be used in an ink jet recording process according to an embodiment of an aspect of the invention.

Preferred embodiments of some aspects of the invention will be described below. The embodiments described below are merely examples of the invention. The invention is not limited to the following embodiments and includes various modifications implemented within the scope of the invention.

1. Radiation-curable Ink Composition

A radiation-curable ink composition according to an embodiment of an aspect of the invention contains an acrylate monomer (A) of which homopolymer has a glass transition temperature of not higher than 0° C. (hereinafter also merely referred to as "component (A)") in an amount of 20% by mass or more and 65% by mass or less based on the total amount of reaction components; a monofunctional acrylate (B) having an alicyclic structure (hereinafter also merely referred to as "component (B)"); and a multifunctional acrylate (C) having an alicyclic structure (hereinafter also merely referred to as "component (C)"). In the invention, the term "reaction components" refers to polymerizable monomers that are used for forming a polymer and does not include additives other than the polymerizable monomers, such as a pigment, a dispersing agent, a photopolymerization initiator, and a slip agent. In the invention, the term "image" refers to a printed pattern formed by groups of dots and includes text patterns and solid patterns.

Each component used in the embodiment will be described below in detail.

1.1. Acrylate Monomer (S) of which Homopolymer has a Glass Transition Temperature of not Higher than 0° C.

The radiation-curable ink composition according to the embodiment contains an acrylate monomer (A) of which homopolymer has a glass transition temperature of not higher than 0° C. as a reaction component. The radiation-curable ink composition according to the embodiment can improve the flexibility and elongation resistance of an image recorded on a recording medium by containing a predetermined amount of component (A) as a reaction component. The acrylate monomer of which homopolymer has a glass transition temperature (Tg) not higher than 0° C. is good in reducibility with other acrylate monomers and does not inhibit the functions of components (B) and (C).

Examples of component (A) include acrylate monomers, such as long-chain alkyl acrylate, (poly)ethylene oxide or (poly)propylene oxide adduct of monofunctional acrylate, and phenoxyethyl acrylate or its modification, shown below. The acrylate monomers shown below may be used alone or in combination.

Long-chain Alkyl Acrylate

Examples of the long-chain alkyl acrylate include 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, and isostearyl acrylate. Among them, isooctyl acrylate (Tg: −58° C.) and n-tridecyl acrylate (Tg: −55° C.) are particularly preferred.

(Poly)ethylene Oxide or (Poly)propylene Oxide Adduct of Monofunctional Acrylate

Examples of the (poly)ethylene oxide or (poly)propylene oxide adduct of monofunctional acrylate include (poly)ethylene glycol monoacrylate, (poly)ethylene glycol acrylate methyl ester, (poly)ethylene glycol acrylate ethyl ester, (poly)ethylene glycol acrylate phenyl ester, (poly)propylene glycol monoacrylate, (poly)propylene glycol monoacrylate phenyl ester, (poly)propylene glycol acrylate methyl ester, (poly)propylene glycol acrylate ethyl ester, methoxytriethylene glycol acrylate, methoxydipropylene glycol acrylate, ethoxydiethylene glycol acrylate, and methoxy-polyethylene glycol acrylate. Among them, methoxytriethylene glycol acrylate (Tg: −50° C.) and ethoxydiethylene glycol acrylate (Tg: −70° C.) are particularly preferred.

Phenoxyethyl Acrylate or its Modification

Examples of the phenoxyethyl acrylate or its modification include phenoxyethyl acrylate, phenoxydiethylene glycol acrylate, phenoxy-polyethylene glycol acrylate, 2-hydroxy-3-phenoxypropyl acrylate, and nonylphenol EO adduct acrylate. Among them, phenoxyethyl acrylate (Tg: −22° C.) and phenoxydiethylene glycol acrylate (Tg: −35° C.) are particularly preferred. In particular, phenoxyethyl acrylate has a satisfactory curing property and is good in reducibility with other polymerizable monomers, and is, therefore, very easy to use.

When the total mass of the reaction components is 100% by mass, the content of component (A) is 20% by mass or more and 65% by mass or less, preferably 35% by mass or more and 65% by mass or less. In this range of component (A) content based on the total mass of the reaction components, the image recorded on a recording medium can have satisfactory flexibility and a high degree of elongation, and cracking and peeling-off do not occur in the image even if the image is held in an elongated state together with the recording medium. If the content of component (A) based on the total mass of the reaction components is smaller than 20% by mass, the degree of elongation is low, which easily causes cracking or peeling-off in the image and significantly decreases the elongation resistance of the image. On the contrary, if the content is greater than 65% by mass, the contents of components (B) and (C) in the reaction components decrease, which may cause decreases in abrasion resistance and weather resistance of the image recorded on a recording medium.

1.2. Monofunctional Acrylate (B) Having an Alicyclic Structure

The radiation-curable ink composition according to the embodiment contains a monofunctional acrylate (B) having an alicyclic structure as a reaction component. Since monofunctional acrylates generally have low viscosities, the radiation-curable ink composition according to the embodiment can adjust its viscosity to a low level (10 mPa·s or more and 40 mPa·s or less at 20° C.) that is suitable for an ink jet recording system by containing the monofunctional acrylate (B) having an alicyclic structure as a reaction component. In addition, the bulky alicyclic structure imparts toughness to the image recorded on a recording medium, which further improves the abrasion resistance. Furthermore, the monofunctional acrylate having an alicyclic structure, not an aromatic ring, also can improve weather resistance. The monofunctional acrylate (B) having an alicyclic structure has good reducibility with other acrylate monomers and does not inhibit the functions of components (A) and (C).

Examples of the monofunctional acrylate (B) having an alicyclic structure include dicyclopentenyloxyethyl acrylate, dicyclopentenyl acrylate, dicyclopentanyl acrylate, isobonyl acrylate, and cyclohexyl acrylate. These polymerizable monomers may be used alone or in combination.

When the total mass of the reaction components is 100% by mass, the content of the monofunctional acrylate (B) having an alicyclic structure is preferably 20% by mass or more and 65% by mass or less. If the content of the monofunctional acrylate (B) having an alicyclic structure based on the total mass of the reaction components is smaller than 20% by mass, the abrasion resistance of the image recorded on a recording medium tends to decrease. On the contrary, if the content is greater than 65% by mass, the flexibility of the image formed on a recording medium tends to decrease, which readily causes cracking and peeling-off in the image recorded on a recording medium.

1.3. Multifunctional Acrylate (C) Having an Alicyclic Structure

The radiation-curable ink composition according to the embodiment contains a multifunctional acrylate (C) having an alicyclic structure as a reaction component. Since the radiation-curable ink composition according to the embodiment contains 20% by mass or more and 65% by mass or less of component (A) as a reaction component, the image recorded on a recording medium has excellent flexibility as described above. The multifunctional acrylate (C) having an alicyclic structure functions as a crosslinking agent for enhancing the strength of the image recorded on a recording medium, while maintaining the flexibility of the image. In addition, the multifunctional acrylate having the bulky alicyclic structure not only can reduce the curing time through the photopolymerization but also can improve the strength of the formed polymer. That is, the radiation-curable ink composition according to the embodiment can impart toughness to the image recorded on a recording medium by containing the multifunctional acrylate (C) having an alicyclic structure as a reaction component, resulting in an improvement in abrasion resistance. Furthermore, since the monofunctional acrylate having an alicyclic structure, not an aromatic ring, also can improve weather resistance. The monofunctional acrylate (C) having an alicyclic structure has good reducibility with other acrylate monomers and does not inhibit the functions of components (A) and (B).

Examples of the multifunctional acrylate (C) having an alicyclic structure include dimethylol tricyclodecane diacrylate and ethoxylated cyclohexane dimethanol diacrylate. Among them, from the viewpoint of not deteriorating the degree of elongation of the image recorded on a recording medium, bifunctional acrylates such as dimethylol tricyclodecane diacrylate are preferred. These polymerizable monomers may be used alone or in combination.

When the total mass of the reaction components is 100% by mass, the content of the monofunctional acrylate (C) having an alicyclic structure is preferably 1% by mass or more and 20% by mass or less, preferably 10% by mass or more and 20% by mass or less. If the content of the monofunctional acrylate (C) having an alicyclic structure based on the total mass of the reaction components is smaller than 1% by mass, the abrasion resistance of the image recorded on a recording medium tends to decrease. On the contrary, if the content is greater than 20% by mass, the flexibility of the image formed on a recording medium tends to decrease, which readily causes cracking and peeling-off in the image recorded on a recording medium. In addition, a content of greater than 20% by mass increases the viscosity of the radiation-curable ink composition, which has a tendency to cause, for example, clogging of the nozzle of an ink jet printer.

1.4. Aminoacrylate (D)

The radiation-curable ink composition according to the embodiment may further contain aminoacrylate (D) as a reaction component. In the radiation-curable ink composition according to the embodiment containing the aminoacrylate (D) as a reaction component, the copolymerization is enhanced.

When the total mass of the reaction components is 100% by mass, the content of the aminoacrylate (D) is preferably 1% by mass or more and 5% by mass or less. If the content of the aminoacrylate (D) based on the total mass of the reaction components is smaller than 1% by mass, the copolymerization does not smoothly proceed, which may cause insufficient curing of the image recoded on a recording medium. On the contrary, a content of greater than 5% by mass does not improve the curing property and is therefore excessive addition, which is not preferred.

1.5. Photopolymerization Initiator (E)

The radiation-curable ink composition according to the embodiment may further contain a photopolymerization initiator (E), other than the above-described reaction components. The photopolymerization initiator is the generic name of compounds having a function to initiate copolymerization of the above-described reaction components when the radiation-curable ink composition discharged on a recording medium is irradiated with active radiation.

Examples of the photopolymerization initiator (E) include known photopolymerization initiators such as alkylphenone photopolymerization initiators, acylphosphine oxide photopolymerization initiators, titanocene photopolymerization initiators, and thioxanthone photopolymerization initiators. Among them, preferred are 2,4,6-trimethylbenzoyl-diphenyl-phosphine oxide, which is excellent in compatibility with the above-described reaction components, molecular cleavage-type photopolymerization initiators such as bis(2,4,6-trimethylbenzoyl)-phenylphosphine oxide having broad light-absorbing characteristics, and hydrogen abstraction-type photopolymerization initiators such as diethylthioxanthone. In the acylphosphine oxide photopolymerization initiators, the structure of the chromophore largely changes after photocleavage to cause a large change in absorption, resulting in so-called photobleaching, a decrease in absorption. Therefore, the acylphosphine oxide photopolymerization initiators are preferred. In addition, yellowing hardly occurs, though the absorption ranges from the UV region to the VL region, and also the internal curing is excellent. Accordingly, the acylphosphine oxide photopolymerization initiators are particularly suitable for transparent thick films and pigment-containing coating films showing high shielding performance. The thioxanthone photopolymerization initiators have a function of reacting with oxygen remaining in the reaction system after photocleavage to reduce the oxygen concentration in the system and are therefore preferred. Since the degree of radical polymerization inhibition can be reduced by the degree of a decrease in the oxygen concentration, the surface-curing property can be improved. Furthermore, use of both the acylphosphine oxide photopolymerization initiator and the thioxanthone photopolymerization initiator is particularly preferred. These photopolymerization initiators may be used alone, but a combination of two or more can extract each characteristic feature maximally.

When the total mass of the reaction components is 100 parts by mass, the content of the photopolymerization initiator (E) is preferably 1 part by mass or more and 20 parts by mass or less, more preferably 5 parts by mass or more and 15 parts by mass or less. If the content of the photopolymerization initiator (E) based on 100 parts by mass of the reaction components is smaller than 1 part by mass, the photopolymerization initiator does not function in some cases, and the curing property of the image recorded on a recording medium may be insufficient. On the contrary, a content of greater than 20 parts by mass does not improve the effect of initiating copolymerization of the above-described reaction components and is therefore excessive addition, which is not preferred.

1.6. Other Additives

The radiation-curable ink composition according to the embodiment may contain additives such as a pigment, a dispersing agent, a slip agent, and a polymerization inhibitor, as necessary.

The radiation-curable ink composition according to the embodiment is preferably a solventless radiation-curable ink composition, not containing organic solvents.

The radiation-curable ink composition according to the embodiment can directly function as a so-called clear ink, but may further contain a pigment. The pigment that can be used in the embodiment is not particularly limited, and examples thereof include inorganic pigments and organic pigments. Examples of the inorganic pigment that can be used include carbon black produced by a known method such as a contact method, a furnace method, or a thermal method, in addition to titanium oxide and iron oxide. Examples of the organic pigment that can be used include azo pigments (including azo lake, insoluble azo pigments, condensed azo pigments, and chelate azo pigments), polycyclic pigments (e.g., a phthalocyanine pigment, a perylene pigment, a perynone pigment, an anthraquinone pigment, and a quinofuraron pigment), nitro pigments, nitroso pigments, and aniline black.

As specific examples of the pigment that can be used in the embodiment, examples of the carbon black include C. I. Pigment Black 7, such as No. 2300, No. 900, MCF88, No. 33, No. 40, No. 45, No. 52, MA7, MA8, MA100, and No. 2200B, which are available from Mitsubishi Chemical Corp.; Raven 5750, Raven 5250, Raven 5000, Raven 3500, Raven 1255, and Raven 700, which are available from Colombia Chemical Company; Regal 400R, Regal 330R, Regal 660R, Mogul L, Mogul 700, Monarch 800, Monarch 880, Monarch 900, Monarch 1000, Monarch 1100, Monarch 1300, and Monarch 1400, which are available from Cabot; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4, which are available from Degussa.

When the radiation-curable ink composition according to the embodiment is a yellow ink, examples of the pigment that can be used include C. I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

When the radiation-curable ink composition according to the embodiment is a magenta ink, examples of the pigment that can be used include C. I. Pigment Red 5, 7, 12, 48(Ca), 48(Mn), 57(Ca), 57:1, 112, 122, 123, 168, 184, 202, and 209, and C. I. Pigment violet 19.

When the radiation-curable ink composition according to the embodiment is a cyan ink, examples of the pigment that can be used include C. I. Pigment Blue 1, 2, 3, 15:3, 15:4, 16, 22, and 60.

When the radiation-curable ink composition according to the embodiment is a green ink, examples of the pigment that can be used include C. I. Pigment Green 7, 8, and 36.

When the radiation-curable ink composition according to the embodiment is an orange ink, examples of the pigment that can be used include C. I. Pigment Orange 51 and 66.

When the radiation-curable ink composition according to the embodiment is a white ink, examples of the pigment that can be used include basic lead carbonate, zinc oxide, titanium oxide, and strontium titanate.

The pigment that can be used in the embodiment preferably has an average particle diameter in the range of 10 to 200 nm, more preferably in the range of 50 to 150 nm.

The content of the pigment that can be contained in the radiation-curable ink composition according to the embodiment is preferably 0.1 to 25 parts by mass, more preferably 0.5 to 15 parts by mass, based on 100 parts by mass of the reaction components.

The radiation-curable ink composition according to the embodiment may contain a dispersing agent for enhancing the dispersing properties of the above-described pigment. Examples of the dispersing agent that can be used in the embodiment include polymer dispersing agents, such as Solsperse 3000, 5000, 9000, 12000, 13240, 17000, 24000, 26000, 28000, and 36000 (products of Lubrizol Corporation) and Discole N-503, N-506, N-509, N-512, N-515, N-518, and N-520 (products of Dai-ichi Kogyo Seiyaku Co., Ltd.).

The radiation-curable ink composition according to the embodiment may contain a slip agent. The slip agent that can be used in the embodiment is preferably a silicone surfactant, more preferably polyester-modified silicone or polyether-modified silicone. Specific examples of the polyester-modified silicone include BYK-347, BYK-348, BYK-UV 3500, BYK-UV 3510, and BYK-UV 3530 (products of BYK-Chemie Japan), and specific examples of the polyether-modified silicone include BYK-3570 (a product of BYK-Chemie Japan).

The radiation-curable ink composition according to the embodiment may contain a polymerization inhibitor. Examples of the polymerization inhibitor that can be used in the embodiment include hydroquinone, benzoquinone, and p-methoxyphenol.

1.7. Physical Properties

The radiation-curable ink composition according to the embodiment preferably has a viscosity at 20° C. of 10 to 40 mPa·s, more preferably 15 to 25 mPa·s. In the radiation-curable ink composition having a viscosity at 20° C. within the above-mentioned range, a proper amount of the radiation-curable ink composition can be discharged from a nozzle to further reduce curved flight or dispersion of the radiation-curable ink composition. Accordingly, the radiation-curable ink composition can be suitably applied to an ink jet recording apparatus. The viscosity can be measured with a viscosity analyzer MCR-300 (a product of Pysica) under environment of 20° C. by changing the shear rate from 10 to 1000 and reading the viscosity at a shear rate of 200.

The radiation-curable ink composition according to the embodiment preferably has a surface tension at 20° C. of 20 mN/m or more and 30 mN/m or less. The radiation-curable ink composition having a surface tension at 20° C. within the above-mentioned range hardly moistens a water repellency-treated nozzle. As a result, a proper amount of the radiation-curable ink composition can be discharged from the nozzle to further reduce curved flight or dispersion of the radiation-curable ink composition, and accordingly, the radiation-curable ink composition can be suitably applied to an ink jet recording apparatus. The surface tension can be measured with an automatic surface tensiometer, CBVP-Z (a product of Kyowa Interface Science Co., Ltd.) under environment of 20° C. by confirming the surface tension when a platinum plate is wetted with the ink.

2. Ink Jet Recording Process

An ink jet recording process according to an embodiment of an aspect of the invention includes the step (a) discharging the above-described radiation-curable ink composition onto a recording medium, and the step (b) irradiating the radiation-curable ink composition discharged on the recording medium with active radiation having an emission peak wavelength in a range of 350 to 430 nm emitted by an active radiation light source.

Each step of the ink jet recording process according to the embodiment will be described below.

2.1. Step (a)

In this step, the above-described radiation-curable ink composition is discharged onto a recording medium.

The radiation-curable ink composition is as described above, and its detailed description is omitted.

The recording medium is not particularly limited, but examples thereof include plastics such as polyvinyl chloride, polyethylene terephthalate, polypropylene, polyethylene, and polycarbonate; media having surfaces coated with such plastics; glass; and coated paper.

The radiation-curable ink composition may be discharged by any method. For example, an ink jet recording apparatus described below can be used.

FIG. 1 is a perspective view of an ink jet recording apparatus that can be used for the ink jet recording process according to the embodiment.

The ink jet recording apparatus 20 shown in FIG. 1 includes a motor 30 for transporting a recording medium P in the sub-scanning direction SS; a platen 40; a printing head 52 as a recording head for spraying the radiation-curable ink composition in the form of tiny droplets from a head nozzle to discharge them onto the recording medium P; a carriage 50 mounted on the printing head 52; a carriage motor 60 for moving the carriage 50 in the main-scanning direction MS; and a pair of active-radiation irradiating apparatuses 90A and 90B for irradiating with active radiation the ink-adhering surface of the recording medium P on which the radiation-curable ink composition was discharged by the printing head 52.

The carriage 50 is towed with a tow belt 62 that is driven by the carriage motor 60 and moves along a guide rail 64.

The printing head 52 shown in FIG. 1 is a serial type head for full color printing by spraying three or more color inks and has a large number of head nozzles for each color. On the carriage 50, in addition to the printing head 52, a black cartridge 54 as a black-ink container for containing a black ink to be supplied to the printing head 52 and a color ink cartridge 56 as a color-ink container containing color inks to be supplied to the printing head 52 are mounted. The ink contained in each of the cartridges 54 and 56 is the above-described radiation-curable ink composition.

A capping device 80 for sealing the nozzle face of the printing head 52 in the stoppage state is provided on the home position of the carriage 50 (the position on the right side in FIG. 1). When the carriage 50 reaches above the capping device 80 after completion of printing job, the capping device 80 automatically move upwards by a mechanism (not shown) to seal the nozzle face of the printing head 52. By this capping, the ink in the nozzle can be prevented from drying. Position controlling of the carriage 50 is carried out for, for example, precisely positioning the carriage 50 to the position of the capping device 80.

The radiation-curable ink composition can be discharged onto a recording medium by using the ink jet recording apparatus 20. In the ink jet recording apparatus 20, the steps (a) and (b) can be continuously performed using a single apparatus, without performing the step (a) and the step (b) with different apparatuses.

2.2. Step (b)

In this step, the discharged radiation-curable ink composition is irradiated with active radiation having an emission peak wavelength in a range of 350 to 430 nm emitted by an active radiation light source. According to this step, the radiation-curable ink composition discharged on the recording medium cures by the irradiation with active irradiation having a specific wavelength. Thus, an image is recorded on the recording medium.

A case in which the step (b) is carried out using the above-described ink jet recording apparatus 20 will be described in detail below.

Figure 2:
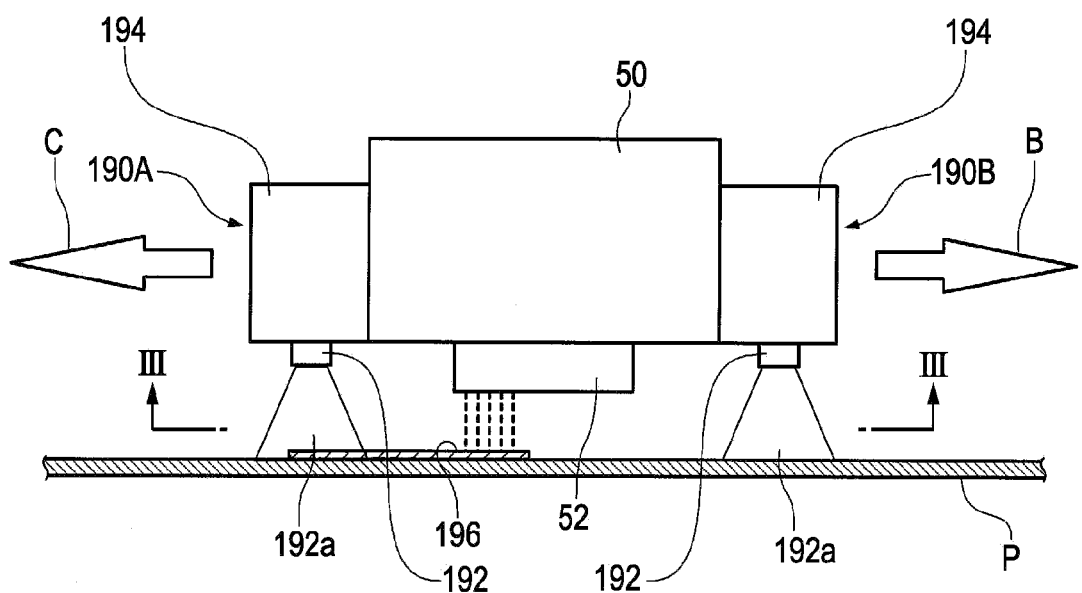
FIG. 2 is a front view of the active-radiation irradiating apparatus of the ink jet recording apparatus shown in FIG. 1.
Figure 3:
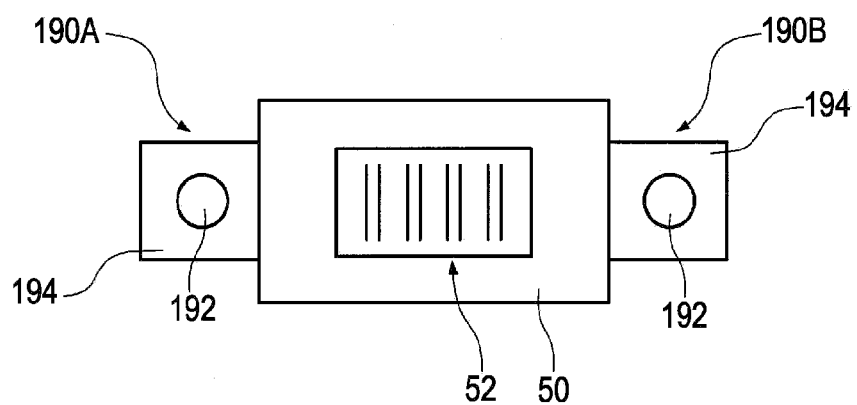
FIG. 3 is a sectional view taken along the line III-III of FIG. 2.

FIG. 2 is a front view of the active-radiation irradiating apparatuses 90A (corresponding to 190A in FIG. 2) and 90B (corresponding to 190B in FIG. 2) shown in FIG. 1. FIG. 3 is a cross-sectional view taken along the line III-III of FIG. 2.

As shown in FIGS. 1 to 3, the active-radiation irradiating apparatuses 190A and 190B are respectively installed on both side edges along the moving direction of the carriage 50.

As shown in FIG. 1, the active-radiation irradiating apparatus 190A installed on the left side of the printing head 52 irradiates an ink layer 196 discharged on a recording medium P with active radiation during rightward scanning in which the carriage 50 moves in the rightward direction (the direction shown by the arrow B in FIG. 2). On the other hand, the active-radiation irradiating apparatus 190B installed on the right side of the printing head 52 irradiates the ink layer 196 discharged on the recording medium P with active radiation during leftward scanning in which the carriage 50 moves in the leftward direction (the direction shown by the arrow C in FIG. 2).

Each of the active-radiation irradiating apparatuses 190A and 190B includes a chassis 194 being attached to the carriage 50 and supporting an active-radiation light source 192 and a light source controlling circuit (not shown) controlling turning on and off of the active-radiation light source 192. As shown in FIGS. 2 and 3, the active-radiation irradiating apparatuses 190A and 190B are each provided with one active-radiation light source 192, but may be each provided with two or more active-radiation light sources. The active-radiation light source 192 is preferably either a light emitting diode (LED) or a laser diode (LD). By doing so, an increase in size of the active-radiation light source can be avoided, because it is unnecessary to be equipped with, for example, a filter, compared to the case in which a mercury lamp, a metal halide lamp, or another lamp is used as the active-radiation light source. In addition, a decrease in emitted active radiation intensity, due to absorption by a filter, does not occur to efficiently cure the radiation-curable ink composition.

The wavelengths of radiation emitted by the radiation active-radiation light sources 192 may be the same or different. In the case that the active-radiation light source 192 is an LED or LD, the emission peak wavelength of the active radiation emitted by the active-radiation light source 192 may be in a range of about 350 to 430 nm.

By using the above-described active-radiation irradiating apparatuses 190A and 190B, as shown in FIG. 2, the ink layer 196, formed by discharge of the radiation-curable ink composition from the printing head 52 and adhering to the recording medium P, is irradiated with active radiation 192a emitted by the active-radiation light source 192 from above the recording medium P near the printing head 52 to cure the surface and the inside of the ink layer 196.

The irradiation dose of the active radiation is appropriately selected depending on the thickness of the ink layer 196 adhering to the recording medium P and therefore cannot be strictly determined, but since the above-described radiation-curable ink composition is used, an active radiation dose of about 300 to 1000 mJ/cm$^2$ is sufficient for curing the ink layer 196.

By using the ink jet recording apparatus 20, even in full color printing of an ink layer having a relatively small thickness using a radiation-curable ink composition having a relatively low viscosity, a plurality of radiation-curable ink compositions discharged on a recording medium P can satisfactorily cure without causing bleeding or mixing with another color.

The configuration of the ink jet recording apparatus 20 is not limited to the above-described recording head, carriage, active-radiation light source, and so on, and various configurations can be employed based on the purpose of the ink jet recording process according to the embodiment.

3. Recorded Matter

A recorded mater according to an embodiment of an aspect of the invention is that recorded by the above-described ink jet recording process. The image recorded on a recording medium is formed by using the above-described radiation-curable ink composition and is therefore excellent in flexibility and elongation resistance and also excellent in abrasion resistance and weather resistance.

The application of the recorded matter according to the embodiment is not particularly limited, and the recorded matter can be used as an image recorded on the above-described recording medium. The image recorded on the recording medium is excellent in flexibility and elongation resistance and also excellent in abrasion resistance and weather resistance, and is therefore particularly suitable for application in which the image is attached to goods that are required to be bent or to be stretched.

4. Examples

The invention will be more specifically described with reference to examples below, but is not limited to them.

4.1. Preparation of Pigment Dispersion

A phenoxyethyl acrylate (trade name: V#192, a product of Osaka Organic Chemical Industry Ltd.) was added to a cyan pigment (trade name: IRGALITE BLUE GLVO, a product of Ciba Geigy, 15 parts by mass) serving as a coloring agent and Solsperse 36000 (a product of LUBRIZOL Corporation, 1.2 parts by mass) serving as a dispersing agent to make the total mass 100 parts by mass, followed by mixing. The resulting mixture was subjected to dispersion treatment using zirconia beads (diameter: 1.5 mm) with a sand mill (a product of Yasukawa Seisakusyo K.K.) for 6 hours. Subsequently, the zirconia beads were removed with a separator to obtain a cyan pigment dispersion to be used in Example 1.

Cyan dispersions to be used in Examples 2 to 10 and Comparative Examples 1 to 5 were prepared as in above except that components (A) and components (B) shown in Tables 1 and 2 were used instead of the phenoxyethyl acrylate.

4.2. Preparation of Radiation-Curable Ink Composition

Reaction components, photopolymerization initiators, and slip agents were mixed so as to be completely dissolved to give compositions shown in Tables 1 and 2. To each of the resulting solutions, the cyan pigment dispersion was dropped with stirring so that the concentration of the cyan pigment was that shown in Table 1 or 2. After the addition of the cyan pigment dispersion, the mixture was stirred at ordinary temperature for 1 hour, followed by filtration through a 5 μm membrane filter to obtain each radiation-curable ink composition.

The components shown in Tables 1 and 2 are as follows:

phenoxyethyl acrylate (trade name: V#192, a product of Osaka Organic Chemical Industry Ltd.);

phenoxydiethylene glycol acrylate (trade name: NK Ester AMP-20GY, a product of Shin-Nakamura Chemical Co., Ltd.);

n-tridecyl acrylate (trade name: SR489, a product of Sartomer Japan Inc.);

isooctyl acrylate (trade name: IOAA, a product of Osaka Organic Chemical Industry Ltd.);

ethoxydiethylene glycol acrylate (trade name: Light Acrylate EC-A, a product of Kyoeisha Chemical Co., Ltd.);

methoxytriethylene glycol acrylate (trade name: V-MTG, a product of Osaka Organic Chemical Industry Ltd.);

dicyclopentenyloxyethyl acrylate (trade name: FA512AS, a product of Hitachi Chemical Co., Ltd.);

dicyclopentenyl acrylate (trade name: FA511AS, a product of Hitachi Chemical Co., Ltd.);

dimethylol tricyclodecane diacrylate (trade name: EBECRYL IRR214K, a product of Daicel-Cytec Company Ltd.);

aminoacrylate (trade name: EBECRYL 7100, a product of Daicel-Cytec Company Ltd.);

IRGACURE 819 (a photopolymerization initiator, bis(2,4,6-trimethylbenzoyl)-phenylphosphine oxide, a product of Ciba Inc.);

DAROCUR TPO (a photopolymerization initiator, 2,4,6-trimethylbenzoyl-diphenyl-phosphine oxide, a product of Ciba Inc.);

DETX (a photopolymerization initiator, a product of Nippon Kayaku Co., Ltd.);

BYK-UV 3500 (a slip agent, polydimethylsiloxane having a polyether-modified acrylic group, a product of BYK-Chemie Japan);

IRGALITE BLUE GLVO (a cyan pigment, a product of Ciba Inc.); and

Solsperse 36000 (a dispersing agent, a product of LUBRIZOL Corporation).

4.3. Production of Recorded Matter

The nozzle columns of ink jet printer PX-G5000 (a product of Seiko Epson Corporation) were filled with the respective radiation-curable ink compositions. A solid pattern image was printed on a PVC film (trade name: IJ-180, a product of Sumitomo 3M Limited) so that the printed matter has a thickness of 10 μm with a medium dot diameter at ordinary temperature and ordinary pressure, and the solid pattern image was cured by irradiation with ultraviolet rays having wavelengths of 365 nm and 395 nm at an irradiation intensity of 60 mW/cm$^2$ emitted by the UV-LED of ultraviolet irradiating apparatuses respectively mounted on both sides of the carriage. Thus, recorded matters in which solid pattern images were printed on PVC films were produced. Incidentally, the curing treatment was carried out under curing conditions so that the integral light quantity was 400 mJ/cm$^2$.

4.4. Evaluation Test

The obtained recorded matters were evaluated by the following tests. The evaluation tests were all conducted at room temperature.

4.4.1. Flexibility Evaluation

First, the recorded matter was cut into a predetermined size (this length is defined as $L_0$), and the obtained specimen was set to a tensile tester (model name: TENSILON Universal Material Testing Instrument RTG-1250, a product of A&D Co., Ltd.). The recorded matter was elongated at a tension rate of 100 ram/min, and the time at which cracking or peeling-off (hereinafter referred to as "cracking, etc.") occurred in the recorded matter specimen was visually confirmed. The length of the elongated recorded matter specimen was calculated based on the time from the start of elongation until occurrence of cracking, etc., and this length was defined as $L_1$. The degree of elongation (%) at cracking, etc. of the image formed on a PVC film was calculated by the following expression (1) to evaluate flexibility of the recorded matter.

$$\text{Degree of elongation (\%) at cracking, etc. of image} = \{(L_1-L_0)/L_0\} \times 100 \quad (1)$$

Evaluation criteria are as follows:

AAA: the degree of elongation is not lower than 180%;
AA: the degree of elongation is not lower than 160% and lower than 180%;
A: the degree of elongation is not lower than 140% and lower than 160%;
B: the degree of elongation is not lower than 120% and lower than 140%;
C: the degree of elongation is not lower than 100% and lower than 120%; and
D: the degree of elongation is lower than 100%.

4.4.2. Elongation Resistance Evaluation

First, the recorded matter was cut into a predetermined size (this length is defined as $L_0$), and the obtained specimen was elongated to a degree of elongation of 100% (this length is defined as $L_2$). Then, the recorded matter specimen in the elongated state at a degree of elongation of 100% was fixed to a predetermined tool, and the time from the start of the fixing until occurrence of cracking, etc. was measured to evaluate the elongation resistance of the recorded matter. Here, the term of "degree of elongation of 100%" refers to satisfying the following relationship: Degree of elongation (%)=$\{(L_2-L_0)/L_0\} \times 100 = 100$. Evaluation criteria are as follows:

A: no cracking, etc. is observed in the image held in the elongated state for 84 hours;
B: cracking, etc. is observed in the image held in the elongated state for 36 hours;
C: cracking, etc. is observed in the image held in the elongated state for 24 hours; and
D: cracking, etc. is observed in the image when it is elongated to a degree of elongation of 100%.

4.4.3. Abrasion Resistance Evaluation

The abrasion resistance of an image recorded on a PVC film was evaluated in accordance with JIS K5600-5-10 (Testing method for paints—Part 5: Mechanical property of film—Section 10: Abrasion resistance (Reciprocating test panel method)). Evaluation criteria are as follows:

A: the image surface has no damage;
B: the image surface has less than five damaged points;
C: the image surface has five to ten damage points;
D: a half of the image surface is damaged; and
E: the entire image surface is damaged.

4.4.4. Weather Resistance Evaluation

The recorded matter was attached to a predetermined tool and was set to a weather meter (model name: Super Xenon Weather Meter SX75, a product of Suga Test Instruments, Co, Ltd.). Then, the weather meter was operated at a mode of performing both light irradiation and water spray for 500 hours to evaluate the weather resistance of the recorded matter. Evaluation criteria are as follows:

A: no defect is observed on the image surface;
B: the image surface has cracking, etc. at less than five points;
C: the image surface has cracking, etc. at five to ten points; and
D: notable floating of image or large cracking, etc. occurs.

4.4.5. Viscosity Evaluation

The viscosity at 20° C. of the obtained radiation-curable ink composition was measured with a viscosity analyzer (MCR-300, a product of Pysica). Specifically, the shear rate was increased from 10 to 1000, and the viscosity at a shear rate of 200 was read.

4.5. Evaluation Results

The results of the above-described evaluation test are shown in Tables 1 and 2.

TABLE 1

| | | Component name | Tg (° C.) of homo-polymer | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Reaction component | Component (A) (% by mass) | phenoxyethyl acrylate | −22 | 44.9 | | | | | | | | | |
| | | phenoxydiethylene glycol acrylate | −35 | | 44.9 | | | | | | | | |
| | | n-tridecyl acrylate | −55 | | | 44.9 | | | | | | | |
| | | isooctyl acrylate | −58 | | | | 44.9 | | | 55.1 | 36.1 | | |
| | | ethoxydiethylene glycol acrylate | −70 | | | | | 44.9 | | | | 20.0 | 65.0 |
| | | methoxytriethylene glycol acrylate | −50 | | | | | | 44.9 | | | | |
| | Component (B) (% by mass) | dicyclopentenyloxy-ethyl acrylate | 120 | 22.5 | 22.5 | 22.5 | 22.5 | 22.5 | 22.5 | 22.5 | 22.5 | 32.0 | 10.4 |
| | | dicyclopentenyl acrylate | 14 | 18.0 | 18.0 | 18.0 | 18.0 | 18.0 | 18.0 | 18.0 | 18.0 | 33.0 | 10.0 |
| | Component (C) (% by mass) | dimethyloltricyclodecane diacrylate | | 11.2 | 11.2 | 11.2 | 11.2 | 11.2 | 11.2 | 1.0 | 20.0 | 11.6 | 11.2 |
| | Component (D) (% by mass) | aminoacrylate | | 3.4 | 3.4 | 3.4 | 3.4 | 3.4 | 3.4 | 3.4 | 3.4 | 3.4 | 3.4 |
| | Total amount | | | 100.0 | 100.0 | 100.0 | 100.0 | 100.0 | 100.0 | 100.0 | 100.0 | 100.0 | 100.0 |

TABLE 1-continued

| | Component name | Tg (° C.) of homo-polymer | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Additive | Photopolymerization initiator (E) (parts by mass) | IRGACURE 819 | | 5.0 | 5.0 | 5.0 | 5.0 | 5.0 | 5.0 | 5.0 | 5.0 | 5.0 | 5.0 |
| | | DAROCYR TPO | | 4.0 | 4.0 | 4.0 | 4.0 | 4.0 | 4.0 | 4.0 | 4.0 | 4.0 | 4.0 |
| | | DETX | | 1.0 | 1.0 | 1.0 | 1.0 | 1.0 | 1.0 | 1.0 | 1.0 | 1.0 | 1.0 |
| | Slip agent (parts by mass) | BYK-UV 3500 | | 0.2 | 0.2 | 0.2 | 0.2 | 0.2 | 0.2 | 0.2 | 0.2 | 0.2 | 0.2 |
| | Pigment (parts by mass) | IRGALITE BLUE GLVO | | 2.5 | 2.5 | 2.5 | 2.5 | 2.5 | 2.5 | 2.5 | 2.5 | 2.5 | 2.5 |
| | Dispersing agent (parts by mass) | Solsperse 36000 | | 0.2 | 0.2 | 0.2 | 0.2 | 0.2 | 0.2 | 0.2 | 0.2 | 0.2 | 0.2 |
| Evaluation results | Degree of elongation (%) at cracking, etc. | PVC film | | A | A | A | A | A | A | AA | A | B | AAA |
| | Elongation resistance | PVC film | | A | A | A | A | A | A | A | A | A | A |
| | Abrasion resistance | PVC film | | B | B | C | C | C | C | C | A | A | C |
| | Weather resistance | PVC film | | A | A | A | A | A | A | A | A | A | A |
| | Viscosity at 20° C. (mPa · s) | | | 30 | 31 | 29 | 28 | 28 | 29 | 19 | 38 | 32 | 26 |

TABLE 2

| | Component name | Tg (° C.) of homo-polymer | Comparative Example 1 | Comparative Example 2 | Comparative Example 3 | Comparative Example 4 | Comparative Example 5 |
|---|---|---|---|---|---|---|---|
| Reaction component | Component (A) (% by mass) phenoxyethyl acrylate | −22 | | | | | |
| | phenoxydiethylene glycol acrylate | −35 | | | | | |
| | n-tridecyl acrylate | −55 | | | | | |
| | isooctyl acrylate | −58 | | 70.0 | 10.0 | 44.9 | 65.0 |
| | ethoxydiethylene glycol acrylate | −70 | | | | | |
| | methoxytriethylene glycol acrylate | −50 | | | | | |
| | Component (B) (% by mass) dicyclopentenyloxy-ethyl acrylate | 120 | 45.0 | 7.4 | 40.0 | 28.7 | |
| | dicyclopentenyl acrylate | 14 | 40.4 | 8.0 | 35.4 | 23.0 | |
| | Component (C) (% by mass) dimethyloltricyclodecane diacrylate | | 11.2 | 11.2 | 11.2 | | 31.6 |
| | Component (D) (% by mass) aminoacrylate | | 3.4 | 3.4 | 3.4 | 3.4 | 3.4 |
| | Total amount | | 100.0 | 100.0 | 100.0 | 100.0 | 100.0 |
| Additive | Photopolymerization initiator (E) (parts by mass) | IRGACURE 819 | 5.0 | 5.0 | 5.0 | 5.0 | 5.0 |
| | | DAROCYR TPO | 4.0 | 4.0 | 4.0 | 4.0 | 4.0 |
| | | DETX | 1.0 | 1.0 | 1.0 | 1.0 | 1.0 |
| | Slip agent (parts by mass) | BYK-UV 3500 | 0.2 | 0.2 | 0.2 | 0.2 | 0.2 |
| | Pigment (parts by mass) | IRGALITE BLUE GLVO | 2.5 | 2.5 | 2.5 | 2.5 | 2.5 |
| | Dispersing agent (parts by mass) | Solsperse 36000 | 0.2 | 0.2 | 0.2 | 0.2 | 0.2 |
| Evaluation results | Degree of elongation (%) at cracking, etc. | PVC film | D | AA | D | C | D |
| | Elongation resistance | PVC film | D | A | D | C | D |
| | Abrasion resistance | PVC film | C | E | C | E | E |
| | Weather resistance | PVC film | A | A | A | B | B |
| | Viscosity at 20° C. (mPa · s) | | 34 | 22 | 33 | 21 | 50 |

In radiation-curable ink compositions of Examples 1 to 10 shown in Table 1, the degrees of elongation at cracking, etc. were all 100% or more. The results showed that the radiation-curable ink compositions were excellent in flexibility and had satisfactory elongation resistance. In the evaluation of the abrasion resistance, there was variation in the results of Examples 1 to 10, but the results were all level D or higher to confirm that the images were excellent in abrasion resistance. In addition, satisfactory results were obtained in the weather resistance evaluation.

On the other hand, in the radiation-curable ink composition of Comparative Example 1 shown in Table 2 not containing component (A) in the reaction components, the images recorded thereby were inferior in flexibility and elongation resistance.

The radiation-curable ink composition of Comparative Example 2 shown in Table 2 containing 65% by mass or more of component (A) based on the total amount of the reaction components lost balance, and the images recorded thereby were absolutely inferior in abrasion resistance, while the flexibility and the elongation resistance were excellent.

The radiation-curable ink composition of Comparative Example 3 shown in Table 2 containing less than 20% by mass of component (A) based on the total amount of the reaction components lost balance, and the images recorded thereby were inferior in flexibility and elongation resistance.

In the radiation-curable ink composition of Comparative Example 4 shown in Table 2 not containing component (C) in the reaction components, crosslinking was insufficient to record images absolutely inferior in abrasion resistance.

The radiation-curable ink composition of Comparative Example 5 shown in Table 2 not containing component (B) in the reaction components had a viscosity at 20° C. of 50 mPa·s. Since the viscosity at 20° C. of the radiation-curable ink composition of Comparative Example 5 was too high, it was difficult to discharge the ink by the above-mentioned ink jet printer. In addition, since the radiation-curable ink composition of Comparative Example 5 lost balance, the images recorded thereby were inferior in flexibility and elongation resistance and also absolutely inferior in abrasion resistance.

The invention is not limited to the above-described embodiments, and various modifications are possible. For example, the invention includes configurations that are substantially the same as those described in the embodiments (for example, a configuration having the same function, method, and result, or a configuration having the same object and effect). The invention includes configurations in which portions not essential in the configurations described in the embodiments are replaced with other. The invention also includes configurations that achieve the same functions and effects or achieve the same objects of those of the configurations described in the embodiments. In addition, the invention includes configurations in which known techniques are added to the configurations described in the embodiments.

What is claimed is:

1. A radiation-curable ink composition, comprising:
   an acrylate monomer, of which homopolymer has a glass transition temperature of not higher than 0° C., in an amount of 20% by mass or more and 65% by mass or less based on the total amount of reaction components;
   a monofunctional acrylate having an alicyclic structure, wherein the monofunctional acrylate having an alicyclic structure is in an amount of 20% by mass or more and 65% by mass or less based on the total amount of the reaction components;
   a multifunctional acrylate having an alicyclic structure, wherein the multifunctional acrylate having an alicyclic structure is in an amount of more than 1% by mass and 20% by mass or less based on the total amount of the reaction components; and
   a photopolymerization initiator; wherein:
      the ink composition has a viscosity at 20° C. in the range of about 10 mPa·s to about 40 mPa·s and a surface tension at 20° C. in the range of about 20 mN/m and about 30 mN/m; and
      the acrylate monomer is selected from the group consisting of long-chain alkyl acrylate, (poly)ethylene oxide, (poly)propylene oxide adduct of monofunctional acrylate, and modifications thereof.

2. The radiation-curable ink composition according to claim 1, wherein the multifunctional acrylate having an alicyclic structure is dimethylol tricyclodecane diacrylate.

3. The radiation-curable ink composition according to claim 1, wherein the monofunctional acrylate having an alicyclic structure is at least one selected from dicyclopentenyl acrylate, dicyclopentanyl acrylate, and dicyclopentenyloxyethyl acrylate.

4. The radiation-curable ink composition according to claim 1, further comprising an aminoacrylate.

5. An ink jet recording process comprising:
   (a) discharging the radiation-curable ink composition according to claim 1 on a recording medium; and
   (b) irradiating the discharged radiation-curable ink composition with active radiation having an emission peak wavelength in a range of 350 to 430 nm emitted by an active radiation light source.

6. An ink jet recording process comprising:
   (a) discharging the radiation-curable ink composition according to claim 2 on a recording medium; and
   (b) irradiating the discharged radiation-curable ink composition with active radiation having an emission peak wavelength in a range of 350 to 430 nm emitted by an active radiation light source.

7. An ink jet recording process comprising:
   (a) discharging the radiation-curable ink composition according to claim 3 on a recording medium; and
   (b) irradiating the discharged radiation-curable ink composition with active radiation having an emission peak wavelength in a range of 350 to 430 nm emitted by an active radiation light source.

8. An ink jet recording process comprising:
   (a) discharging the radiation-curable ink composition according to claim 4 on a recording medium; and
   (b) irradiating the discharged radiation-curable ink composition with active radiation having an emission peak wavelength in a range of 350 to 430 nm emitted by an active radiation light source.

9. A recorded matter recorded by the ink jet recording process according to claim 5.

10. A radiation-curable ink composition, comprising:
    an acrylate monomer, of which homopolymer has a glass transition temperature of not higher than 0° C., in an amount of 20% by mass or more and 65% by mass or less based on the total amount of reaction components;
    a monofunctional acrylate having an alicyclic structure, wherein the monofunctional acrylate having an alicyclic structure is in an amount of 20% by mass or more and 65% by mass or less based on the total amount of the reaction components;
    a multifunctional acrylate having an alicyclic structure, wherein the multifunctional acrylate having an alicyclic structure is in an amount of 1% by mass or more and 20% by mass or less based on the total amount of the reaction components; and
    a photopolymerization initiator; wherein:
       the ink composition has a viscosity at 20° C. in the range of about 10 mPa·s to about 40 mPa·s and a surface tension at 20° C. in the range of about 20 mN/m and about 30 mN/m;
       the monofunctional acrylate having an alicyclic structure is at least one selected from dicyclopentenyl acrylate, dicyclopentanyl acrylate, and dicyclopentenyloxyethyl acrylate; and
       the acrylate monomer is selected from the group consisting of long-chain alkyl acrylate, (poly)ethylene oxide, (poly)propylene oxide adduct of monofunctional acrylate, and modifications thereof.

11. The radiation-curable ink composition according to claim 10, wherein the multifunctional acrylate having an alicyclic structure is dimethylol tricyclodecane diacrylate.

12. The radiation-curable ink composition according to claim 10, further comprising an aminoacrylate.

* * * * *